United States Patent
Dishman et al.

(10) Patent No.: US 8,054,599 B2
(45) Date of Patent: Nov. 8, 2011

(54) APPARATUS, SYSTEM, AND METHOD FOR DETECTING A POWER SYSTEM COMPONENT FAILURE

(75) Inventors: Cecil C. Dishman, Raleigh, NC (US); Randhir S. Malik, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 762 days.

(21) Appl. No.: 12/172,907

(22) Filed: Jul. 14, 2008

(65) Prior Publication Data
US 2010/0007998 A1    Jan. 14, 2010

(51) Int. Cl.
H02H 3/00    (2006.01)
(52) U.S. Cl. .......................................... 361/79
(58) Field of Classification Search ............ 361/79
See application file for complete search history.

(56) References Cited

U.S. PATENT DOCUMENTS

| | | | |
|---|---|---|---|
| 4,843,532 A | 6/1989 | Freedman | |
| 5,600,306 A | 2/1997 | Ichikawa et al. | |
| 5,771,162 A | 6/1998 | Kwon | |
| 6,548,992 B1 | 4/2003 | Alcantar et al. | |
| 6,639,812 B2 * | 10/2003 | Nakazawa et al. | 363/21.07 |
| 6,940,737 B2 * | 9/2005 | Nakazawa et al. | 363/97 |
| 7,908,505 B2 * | 3/2011 | Malik et al. | 713/340 |
| 7,910,833 B2 * | 3/2011 | McGinley et al. | 174/112 |
| 2002/0027786 A1 * | 3/2002 | Nakazawa et al. | 363/21.05 |
| 2004/0105281 A1 * | 6/2004 | Nakazawa et al. | 363/21.07 |
| 2004/0252533 A1 * | 12/2004 | Eguchi | 363/97 |
| 2005/0146826 A1 | 7/2005 | Huang | |
| 2007/0057658 A1 * | 3/2007 | Hasegawa | 323/282 |
| 2010/0328849 A1 * | 12/2010 | Ewing et al. | 361/622 |

FOREIGN PATENT DOCUMENTS

| | | |
|---|---|---|
| JP | 63168710 | 7/1988 |
| JP | 11164547 | 6/1999 |
| JP | 11233204 | 8/1999 |

* cited by examiner

*Primary Examiner* — Ronald W Leja
(74) *Attorney, Agent, or Firm* — Kunzler Needham Massey & Thorpe

(57) ABSTRACT

An apparatus, system, and method are disclosed for detecting a power system component failure. The invention includes detecting an amount of input power provided on a power supply side of a connector, where the connector is configured to connect a switching power supply to a load such that power flows from the switching power supply to the load through the connector; detecting an amount of output power provided on a load side of the connector; determining if the amount of input power detected on the power supply side of the connector is more than a predefined threshold amount greater than the amount of output power detected on the load side of the connector; and shutting down the switching power supply the amount of detected input power is more than the predefined threshold amount greater than the amount of detected output power.

20 Claims, 5 Drawing Sheets

APPARATUS, SYSTEM, AND METHOD FOR DETECTING A POWER SYSTEM COMPONENT FAILURE

FIELD OF THE INVENTION

This invention relates to power supplies and more particularly relates to safely connecting devices to a power source.

DESCRIPTION OF THE RELATED ART

A power supply, sometimes known as a power supply unit or PSU, is a device or system that supplies electrical or other types of energy to a load or group of loads. A power supply, in some embodiments may be configured to convert power in one form to another form, such as converting AC power to DC power. The regulation of power supplies is typically done by incorporating circuitry to tightly control the output voltage and/or current of the power supply to a specific value. The specific value is typically closely maintained despite variations in the load presented to the power supply's output, or any reasonable voltage variation at the power supply's input.

A single power supply may be used, in some cases, to simultaneously provide power to several electronic devices or loads. In other cases, multiple redundant power supplies may be used to provide power to a single load or combination of loads. Failures can occur in these types of systems that result in smoke or burning, particularly when there is a short circuit or low impedance condition in some component of the system. It is exceptionally common for such short circuit conditions to be found in a connector that connects a load to the power supply, particularly if the connector has bent or damaged pins or the connection is not properly secured.

Conventional art relies on over-current or over-load protection devices designed into the power system to prevent a shorted or very low impedance load from causing smoke, fire, or other system failure. However, in a power supply that is configured to provide a very high amount of current, a fault caused by a short circuit may be undetectable by conventional devices because the short circuit may appear as an acceptable load condition. This is particularly true where redundant power supplies are utilized to provide redundant power to a common load, and a connector in only one of the power supplies is causing a short circuit. The result can be a catastrophic failure of the system including smoke and fire. In a power system that is providing very high currents to the load, even relatively small changes in resistance at the connector can result in very large power dissipations through the connector. Such situations can result from bent pins or damage to the connector. These high power dissipations that result from slight changes in resistance may cause the connector, or other components, to heat up thereby causing smoke and fire in some cases.

The present invention is provided overcome the problems in the conventional art when a fault occurs that is undetectable using ordinary overcurrent protection devices.

BRIEF SUMMARY

From the foregoing discussion, it should be apparent that a need exists for an apparatus, system, and method that efficiently detect a failure in a power system, and in particular, that detect a failure caused by a connector in a power system. Beneficially, such an apparatus, system, and method would prevent fires, smoke, or other undesirable results from occurring by measuring an amount of input power and an amount of output power and determining if an unexpectedly high dissipation of power is occurring. An unexpectedly high amount of power dissipation may be indicative of a failed power system component such as when there is a short in a connector.

The present invention has been developed in response to the present state of the art, and in particular, in response to the problems and needs in the art that have not yet been fully solved by currently available power systems. Accordingly, the present invention has been developed to provide an apparatus, system, and method for detecting a failure of a power system.

The apparatus to detect a failure of a power system is provided with an input power detection module, an output power detection module, a failure detection module, and a shutdown module.

The input power detection module detects an amount of input power provided on a power supply side of a connector. The connector is typically configured to connect a switching power supply to a load such that power flows from the switching power supply to the load through the connector. The output power detection module detects an amount of output power provided on a load side of the connector. The failure detection module determines if the amount of input power detected on the power supply side of the connector is more than a predefined threshold amount greater than the amount of output power detected on the load side of the connector, thereby indicating a failure of the power system. The shutdown module shuts down the switching power supply in response to the failure detection module determining that the amount of input power detected on the power supply side of the connector is more than the predefined threshold amount greater than the amount of output power detected on the load side of the connector.

In various embodiments, the input power detection module may detect the amount of input power on the power supply side of the connector by monitoring power in various different locations. For example, the input power detection module may detect the amount of input power provided at an input to the switching power supply. In another embodiment, the input detection module may detect the amount of input power at an output of the switching power supply. In yet another embodiment, the input detection module may detect the amount of input power at a node within the switching power supply.

In one embodiment of the apparatus, a lookup table with one or more predefined threshold amounts defined therein may be provided. The one or the one or more predefined threshold amounts in the lookup table may correspond respectively to an amount of output power detected on the load side of the connector, each threshold amount indicating an acceptable amount of power difference between the input power detected on the power supply side of the connector and the output power detected on the load side of the connector for each corresponding amount of output power. Thus, the predefined threshold may vary with the size of the load.

In various additional embodiments, the failure detection module utilizes the lookup table to determine which predefined threshold amount corresponds to a particular amount of power detected on the load side of the connector. Thus, different load sizes, as indicated by the amount of power consumed on the load side of the connector, correspond to different allowable predefined threshold amounts between the input power and output power.

In some embodiments, multiple power supplies may be utilized. In such embodiments, a second input power detection module may detect an amount of input power provided on a power supply side of a second connector. The second connector would typically be configured to connect a second switching power supply to the load such that power flows from the second switching power supply to the load through the second connector, such as in a redundant power system. A second output power detection module may detect an amount of output power provided on the load side of the second connector, and a second failure detection module may be provided to determine if the amount of input power detected on the power supply side of the second connector is more than a predefined threshold amount greater than the amount of output power detected on the load side of the second connector. A second shutdown module may also be provide to shut down the second switching power supply in response to the second failure detection module determining that the amount of input power detected on the power supply side of the second connector is more than the predefined threshold amount greater than the amount of output power detected on the load side of the second connector.

In a further embodiment, one or more of the detected output power, the detected input power, and the predefined threshold amount may be adjusted to account for power changes caused by the connection of the second switching power supply to the load, such as where the amount of power provided to the load is divided between the power supplies.

A system of the present invention is also presented to safely connect a device to a power source. The system may substantially include the disclosed embodiments described above with respect to the apparatus. The system may include a switching power supply, a load and a connector. The connector is typically configured to connect the switching power supply to the load such that power flows from the switching power supply to the load through the connector. The system may also include an input power detection module, an output power detection module, a failure detection module and a shutdown module as described above with regard to the apparatus.

In various embodiments of the system, the load may include an electronic device configured to connect to and receive power from the power supply. For example, the load may be a blade server, peripheral component interconnect ("PCI") card, personal computer, laptop, router, switch, personal digital assistant, appliance, digital media player, or other electronic device as will be recognized by one of skill in the art.

In some embodiments of the system, one or more additional switching power supplies may be connected to the load via one or more additional connectors. In further embodiments, one or more additional input power detection modules, one or more additional output power detection modules, one or more additional failure detection modules, and one or more additional shutdown modules may be provided corresponding respectively to the one or more additional switching power supplies.

A method of the present invention is also presented for safely connecting a device to a power source. The method in the disclosed embodiments substantially includes the steps necessary to carry out the functions presented above with respect to the operation of the described apparatus and system. In one embodiment, the method includes detecting an amount of input power provided on a power supply side of a connector. Typically, the connector is configured to connect a switching power supply to a load such that power flows from the switching power supply to the load through the connector. The method also includes detecting an amount of output power provided on a load side of the connector.

In various embodiments, the method also includes determining if the amount of input power detected on the power supply side of the connector is more than a predefined threshold amount greater than the amount of output power detected on the load side of the connector. In further embodiments, the method may include shutting down the switching power supply in response to determining that the amount of input power detected on the power supply side of the connector is more than the predefined threshold amount greater than the amount of output power detected on the load side of the connector.

In one embodiment, the amount of input power on the power supply side of the connector is detected by detecting an amount of power provided at an input to the power supply. In another embodiment, the amount of input power on the power supply side of the connector is detected by detecting an amount of power provided at an output of the power supply.

In some embodiments of the method, a lookup table that includes one or more predefined threshold amounts may be utilized to retrieve a predefined threshold amount. In a further embodiment, the predefined threshold amounts in the lookup table may indicate an acceptable amount of power difference between the input power detected on the power supply side of the connector and the output power detected on the load side of the connector, each predefined threshold amount corresponding to a particular amount of output power. In this manner different predefined threshold amount may be utilized for different sized loads.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
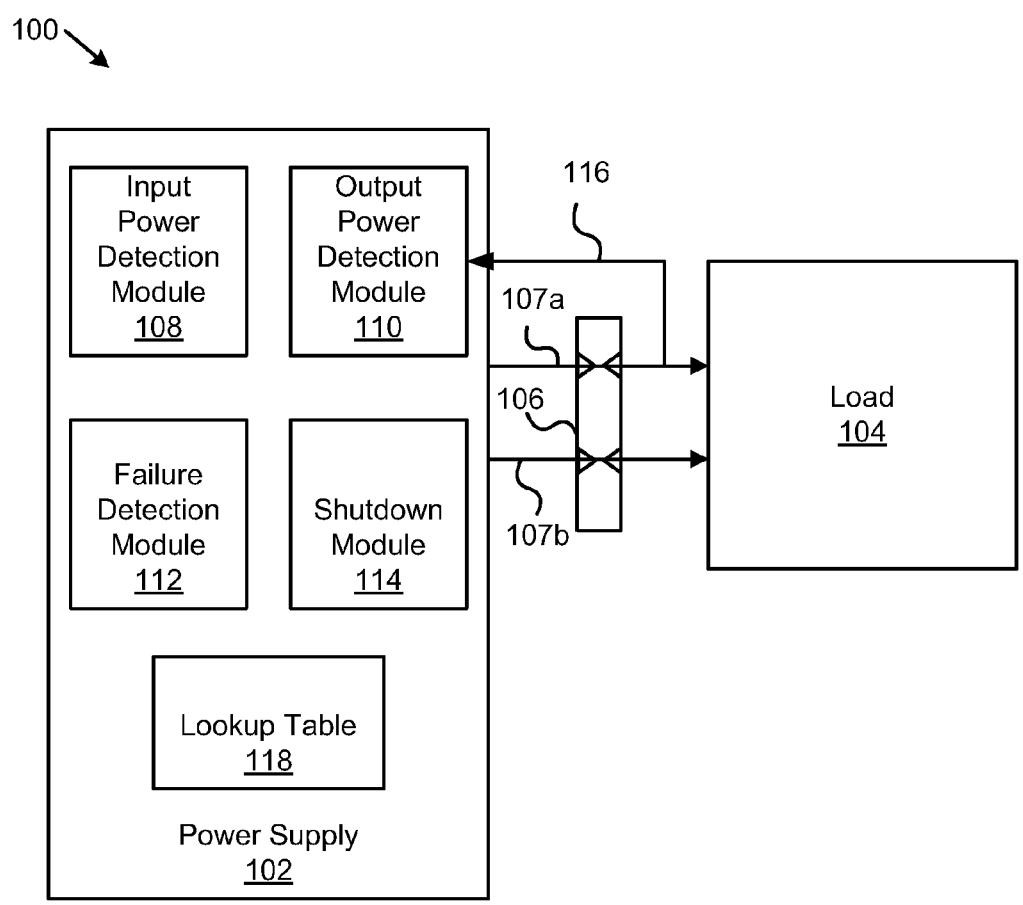
FIG. 1 is a schematic block diagram illustrating one embodiment of a system for detecting a failure in a power system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 is a schematic block diagram illustrating one embodiment of a system 100 for detecting a failure in a power system. The system 100 includes a switching power supply 102 and a load 104 connected together via a connector 106. The connector 106 is configured to connect the switching power supply 102 to the load 104 such that power flows from the switching power supply 102 to the load 104.

In one embodiment, the power supply 102 provides regulated power to the load 104 in order to power various electronic systems and subsystems within the load 104. The power supply 102 may be configured to provide one or more different voltages and currents to the load 104. For example, in a typical switching power supply 102, voltages of +12 v, +5 v, +3.3 v, and −12 v are commonly provided. As depicted, the power supply 102 is providing power in the form of a regulated voltage, through a "hot" or supply line 107a and a neutral or return line 107b to the load 104. One common type of failure of the system 100 may occur when the supply line 107a is shorted with the return line 107b, ground (not shown) or shorted to the chassis, which may cause extremely high amounts of power dissipation through the connector 106 thereby causing smoke or fire.

The switching power supply 102 may include different functionalities and topologies for providing regulated power to the load 104. As will be recognized by those of skill in the art, typical topologies may include rectification, boost, buck, or other topology. The switching power supply 102 may also include various stages that combine one or more of these topologies in order provide one or more desired output voltages to the load 104.

In various embodiments, the load 104 may be an electronic device 104 that receives power from the switching power supply 102. For example, the electronic device 104 may be a computer system such as a desktop, laptop, or server, such that the switching power supply 102 provides power to the various components of the computer system. In other embodiments, the electronic device 104 may include devices such as blade servers, PCI cards, routers, switches, personal digital assistants ("PDAs"), displays, appliances or other electric or electronic devices 104 as recognized by one of skill in the art. In some embodiments, the switching power supply 102 may be implemented within the same enclosure as the electronic device 104, such as within a computer tower case, with a connector 106 provided therein to connect the switching power supply 102 to the load 104. In other embodiments, the switching power supply 102 may be implemented external to the electronic device 104 and may be connected to the electronic device 104 via some external connector 106.

A connector 106 is a junction device that allows one or more nodes of a circuit from a switching power supply 102 to pass electronic power to one or more nodes of a load 104. Typically, a connector 106 is configured such that a load 104 can be secured to a power supply 102 to ensure an uninterrupted connection, yet be manually detached and reattached if needed. Different types of connectors 106 may have different numbers of pins and connections within the connector 106. For example, a common connector 106 in a computer system is a PC Main connector that goes to the mother board to provide it with power. A PC Main power connector usually has 20 or 24 pins and is embodied within a plastic attachment formed to fit securely with a corresponding attachment on the motherboard. Other types of connectors 106 might include auxiliary power connectors for providing auxiliary power, peripheral power connectors for powering devices such as disk drives, serial ATA (Advanced Technology Attachment) power connectors for SATA power plugs, PCI (Peripheral Component Interconnect) power connectors for powering PCI cards, integrated power connectors such as is used with blade systems, etc. Of course, numerous other types of connectors 106 are available as will be recognized by those of skill in the art.

The system 100 also includes several logic modules for detecting a failure in the system 100 including an input power detection module 108, an output power detection module 110, a failure detection module 112, and a shutdown module 114. The modules 108-114 are depicted within the switching power supply 102. However, in various embodiments, the modules 108-114 may be provided in other locations external to the switching power supply 102 as will be recognized by those of skill in the art. Generally, the logic modules provide the functionality to detect an amount of power input to the system 100 on the power supply side of the connector 106 and to detect an amount of output power passed to the load side of the connector 106. The input and output power can then be compared to determine if an unacceptable amount of loss is occurring in the connector 106 or some other component, thereby indicating a failure of the system 100.

The input power detection module 108 preferably detects an amount of input power provided on the power supply side of the connector 106. As used herein, input power refers to an amount of power provided in the system 100 at some point on the power supply side of the connector 106. The phrase "power supply side" of the connector 106 refers to nodes and circuits on the same side of the connector 106 that the switching power supply 102 is attached to, but is not limited only to the nodes directly attached to the connector 106. For example, the input power detection module 108 may detect an amount of input power provided at the input to the switching power supply 102. In another embodiment, the input power detection module 108 may detect an amount of input power on the power supply side of the connector 106 by detecting an amount of power provided at an output of the switching power supply 102. In yet another embodiment, the input power detection module 108 may detect the amount of input power by detecting the amount of power provided to a node within the switching power supply 102, such as a node between stages of the power supply 102.

Typically, the amount of input power is detected by monitoring an amount of input current and input voltage and multiplying the two values together to determine an amount of input power. Of course, as will be recognized by those of skill in the art, other types of power meters and measurements may be used in accordance with the present invention. For example, a hall effect sensor, a measurement of voltage across a known resistor, current transformer, etc. may be used to help determine an amount of input or output power. In some embodiments, the amount of power may be read directly from an existing or provided power meter or measurement device. After detection of the amount of input power in the system 100, the input power detection module 108 provides the amount of detected input power to the failure detection module 112 as will be described below.

The output power detection module 110 operates similar to the input power detection module 108 except that it detects output power on the load side of the connector 106. As used in herein, output power refers to an amount of power provided in the system 100 at some point on the load side of the connector 106. The phrase "load side" of the connector 106 refers to nodes and circuits on the same side of the connector 106 that the load 104 is attached to, but is not limited only to the nodes directly attached to the connector 106.

The amount output power on the load side of the connector 106 is typically measured in a manner similar to that utilized for detecting the amount of input power on the power supply side of the connector 106, such as by measuring an output current and output voltage and multiplying the two values together. As depicted, the output power detection module 110 is located within the switching power supply 102, so circuitry 116 is provided in this embodiment for the output power detection module 110 to monitor the amount of output power on the load side of the connector 106. The output detection power module 110 provides the amount of detected output power to the failure detection module 112 for comparison with the detected input power.

The failure detection module 112 determines if the amount of input power detected on the power supply side of the connector 106 is more than a predefined threshold amount greater than the amount of output power detected on the load side of the connector 106. Typically, if the amount of input power on the power supply side of the connector 106 is much greater than the amount of output power on the load side of the connector 106, then a fault has likely occurred, and there is danger of a component, most likely the connector 106, smoking or starting on fire. Thus, some threshold amount, or acceptable power difference between the input and output power, is preferably defined for use by the failure detection module 112.

In some cases, the predefined threshold may vary depending on the size of the load 104. As will be recognized by those of skill in the art, the efficiency of a switching power supply 102 varies based on the size of the load 104, and therefore varying amounts of power loss between a measured input power on the power supply side of the connector 106 and the load side of the connector 106 are to be expected due to varying efficiency of the power supply 102 under varying load conditions.

In one embodiment, the failure detection module 112 may utilize a lookup table 118 to determine a predefined threshold amount that corresponds to a particular load size. The load size may be determined by examining the amount of output power detected on the load side of the connector 106. The lookup table 118 typically has one or more predefined threshold amounts defined therein. Each of the predefined threshold amounts in the lookup table 118 typically corresponds to an amount of output power detected on the load side of the connector 106 as indicative of a particular load size. Each threshold amount indicates an acceptable amount of power difference between the input power detected on the power supply side of the connector 106 and the output power detected on the load side of the connector 106 for each corresponding amount of output power or load size. Preferably, the varying predefined threshold amounts correspond to a known expected efficiency of the power supply 102 based on the corresponding load size. In some embodiments, other non-linear or linear relationships may be utilized to define an appropriate predefined threshold amount. For example, additional analog circuitry may be utilized to directly determine an appropriate threshold amount or a function may be used to define the predefined threshold by performing calculations using the known input power and/or output power or other variables. In this manner, the failure detection module 112 is able to detect failures in the system 100 even when the load 104 experiences varying size fluctuations.

The shutdown module 114 shuts down the switching power supply 102 in response to the failure detection module 112 determining that the amount of input power detected on the power supply side of the connector 106 is more than the predefined threshold amount greater than the amount of output power detected on the load side of the connector 106. Preferably, the shutdown module 114 shuts down the switching power supply 102 before any of the system components, especially the connector 106, dissipate enough power to begin smoking or to start on fire or otherwise cause damage. In some embodiments, the shutdown module 114 may shutdown only a portion, such as a single stage, of the switching power supply 102. In other embodiments, the shutdown module 114 may send a notification to a user, such as on display screen or other means, to indicate that a failure is imminent.

Figure 2:
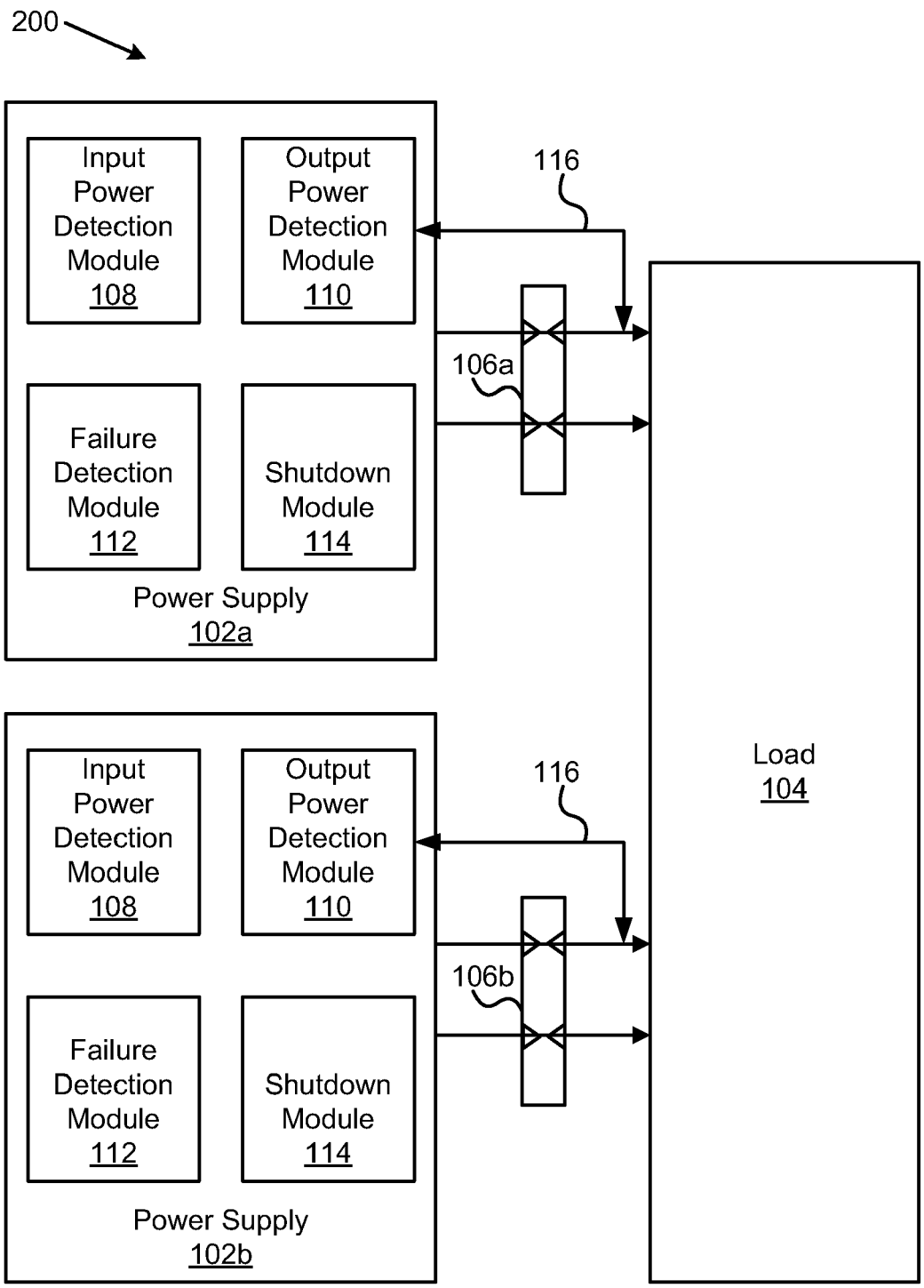
FIG. 2 is a schematic block diagram illustrating one embodiment of a system for detecting a failure in a power system with multiple power supplies in accordance with the present invention.

FIG. 2 is a schematic block diagram illustrating one embodiment of a system 200 for detecting a failure in a power system with multiple power supplies 102a-b in accordance with the present invention. In this embodiment, two power supplies 102a-b are depicted, but as will be recognized by those of skill in the art, numerous additional power supplies 102a-b may be provided in a single system 200. For example, multiple power supplies 102a-b are commonly used to provide redundancy protection in the event one power supply 102a fails, a second power supply 102b will be available to continue providing power to the load 104. Typically an additional connector 106a-b is provided for each additional power supply 102a-b that is used, and each additional connector 106a-b may be at risk of fire or smoke in the event of short therein.

In one embodiment with multiple power supplies 102a-b, separate logic modules 108-114 may be provided for each power supply 102a-b to detect a failure independently in each power supply 102a-b or corresponding connector 106a-b. Thus, if a failure is detected in the first power supply 102a, the shutdown module 114 will shutdown that power supply 102a, but the second power supply 102b will continue to provide power to the load 104 without significant interruption. Thus, a second input power detection module 108, a second output power detection module 110, a second failure detection module 112, and a second shutdown module 114 may be provided with the second power supply 102b for detecting failures in the second power supply 102b. Of course, as will be recognized by those of skill in the art, some embodiments may be implemented in which a single logic module 108-114 may be used to control multiple power supplies 102a-b. For example, a single shutdown module 114 may be utilized to receive a failure detection signal from multiple different failure detection modules 112, or a single failure detection module 112 may be configured to detect failures in multiple different power supplies 102a-b.

In some situations where there are multiple power supplies 102a-b, the detected output power on the power supply side of the connector 106a-b, the detected input power on the load side of the connector 106a-b, or the predefined threshold amount may need to be adjusted to account for power changes caused by the connection of a second switching power supply 102b. For example, multiple power supplies 102a-b might simultaneously share the duty of providing power to the load 104 such that each power supply 102a-b only provides a portion of the needed power to the load 104. In such a case, the amount of input power or output power might be a fraction of what is normally expected if a single power supply 102 is providing all of the power to the load 104. Thus, the system 200 and logic modules 108-114 may be configured to account for expected power changes that result from the use of multiple power supplies 102a-b with a particular load size.

Figure 3:
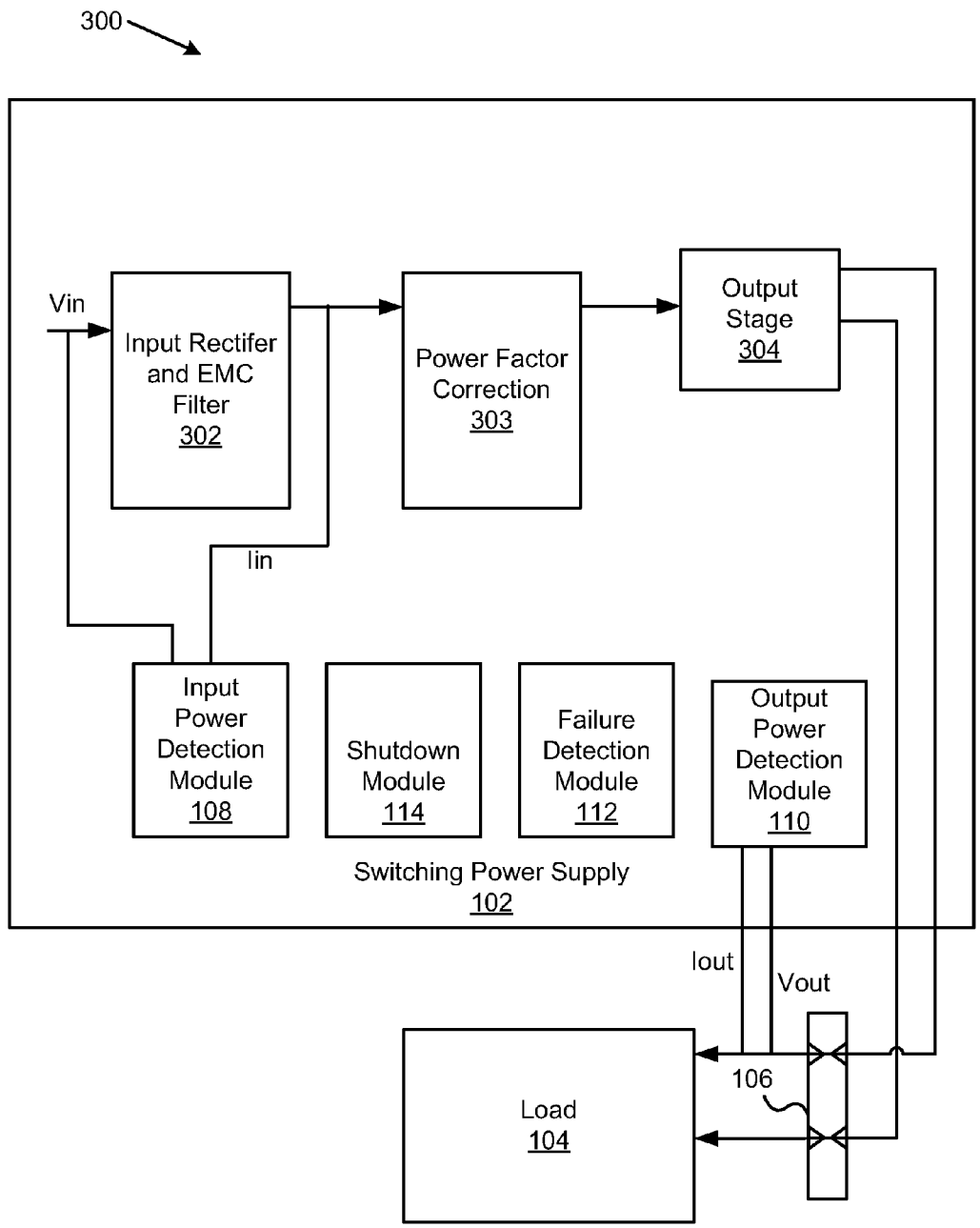
FIG. 3 is a schematic block diagram illustrating a detailed embodiment of a system for detecting a failure in a power system in accordance with the present invention.

FIG. 3 is a schematic block diagram illustrating a detailed embodiment of a system 300 for detecting a failure in a power system in accordance with the present invention. As depicted, a typical switching power supply 102 configuration is provided that includes an input rectifier and EMC (Electromagnetic Compatibility) filter 302, a power factor correction stage 303, and an output stage 304 for providing a regulated voltage Vout through a connector 106 to a load 104. However, as will be recognized by those of skill in the art, numerous additional configurations and topologies are possible in accordance with the present invention. For example, the power factor correction stage 303 is commonly implemented as a boost stage for providing an output voltage greater than an input voltage, but numerous other topology types are contemplated including buck, buck-boost, flyback, etc. Of course, multiple additional stages may also be provided to serve other purposes besides power factor correction and regulation.

The modules depicted in FIG. 3 are substantially similar to those described above in FIGS. 1 and 2. In the depicted embodiment, the input power detection module 108 detects an amount of input power provided on the power supply side of the connector 106 by measuring an input voltage Vin and an input current Iin at or near the input of the switching power supply 102. The output power detection module 110 detects an amount of output power on the node between the load 104 and the connector 106. Typically, this is done by measuring an output voltage Vout and output current Iout. Thus, if a component between the input of the power supply 102 and the load 104 causes an unacceptable amount of power dissipation, or an amount greater than the predefined threshold, then the failure detection module 112 will determine that a failure has occurred, and the shutdown module 114 will cause the switching power supply 102 to shut down.

Figure 4:
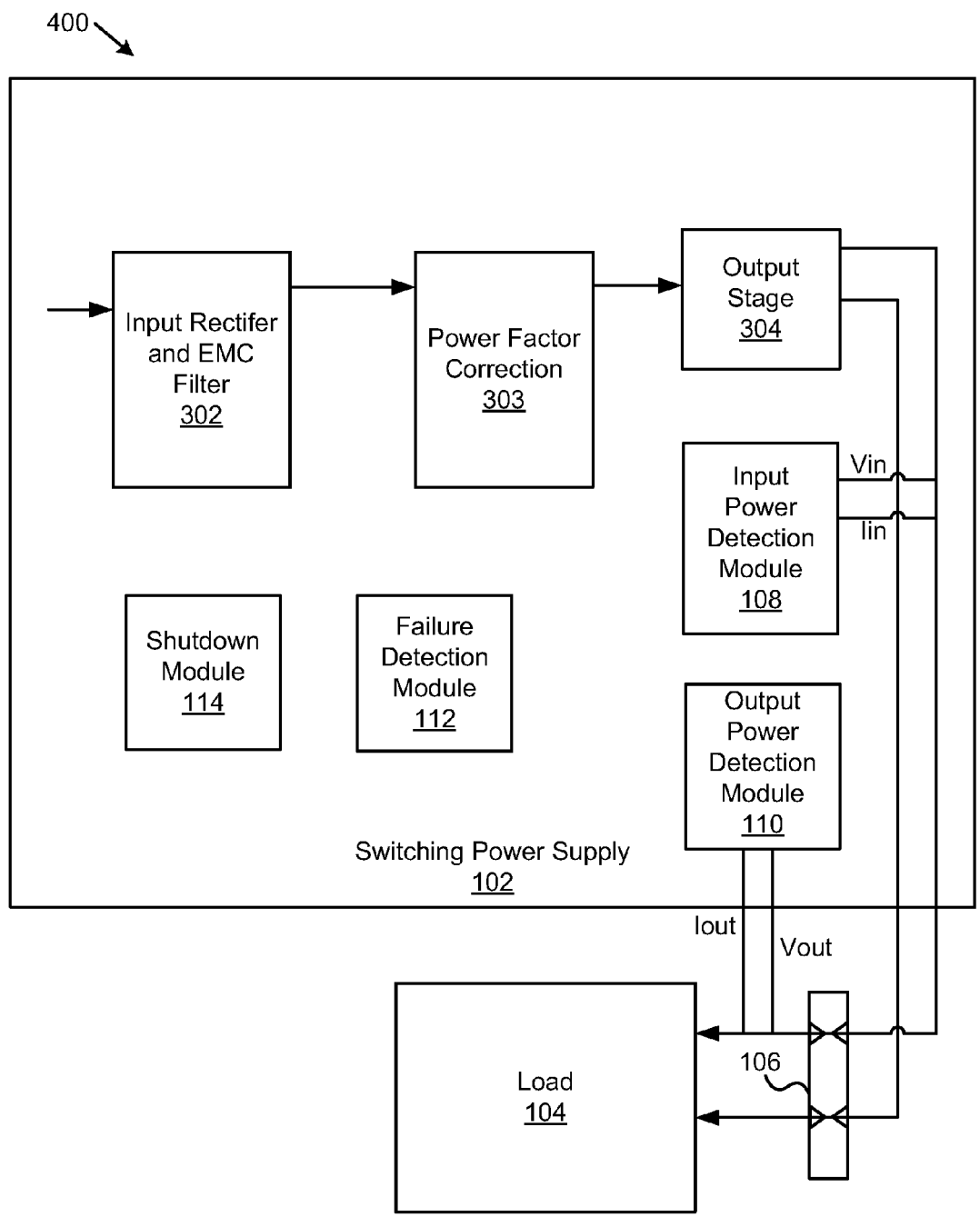
FIG. 4 is a schematic block diagram illustrating another detailed embodiment of a system detecting a failure in a power system in accordance with the present invention.

FIG. 4 is a schematic block diagram illustrating another detailed embodiment of a system 400 detecting a failure in a power system in accordance with the present invention. The depicted system 400 is substantially similar to the system 300 depicted in FIG. 3, except the input power detection module 108 detects the amount of input power at the output of the switching power supply 102 (input of the connector 106) rather than at the input to the switching power supply 102. By detecting the amount of input power at the input to the connector 106 and detecting the amount of output power on the node between the connector 106 and the load 104, the system 400 can be directed to detecting failures that occur only in the connector 106. Thus, if an unacceptable amount of power is being dissipated through the connector 106, the shutdown module 114 shuts down the switching power supply 102 before smoke or fire results.

As will be recognized by those of skill in the art, the input power or output power may be detected at various different nodes in the system 400 to include or exclude components that should be monitored for failure. In some cases, this may also include components provided in the load 104.

Figure 5:
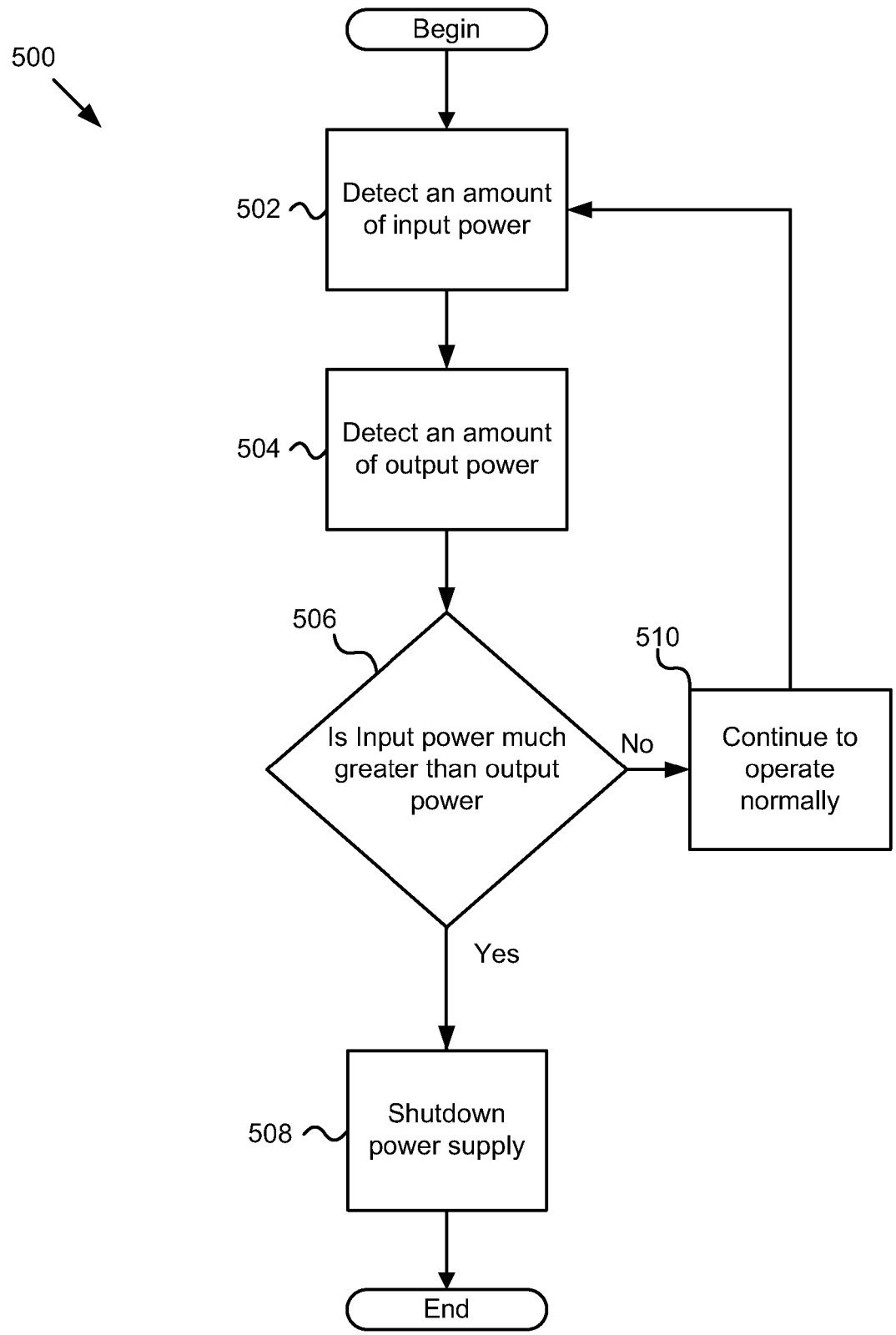
FIG. 5 is a schematic flow chart illustrating one embodiment of a method for detecting a failure in a power system in accordance with the present invention.

FIG. 5 is a schematic flow chart illustrating one embodiment of a method 500 for detecting a failure in a power system in accordance with the present invention. The method 500 substantially includes the embodiments and modules described above with regard to FIGS. 1-4.

The method 500 begins when an input power detection module 108 detects 502 an amount of input power provided on a power supply side of a connector 106. The connector 106 is typically configured to connect a switching power supply 102 to a load 104 such that power flows from the switching power supply 102 to the load 104 through the connector 106. Next, an output power detection module 110 detects 504 an amount of output power provided on a load side of the connector 106.

A failure detection module 112 determines 506 if the input power is much greater than the output power by determining 506 if the amount of input power detected on the power supply side of the connector 106 is more than a predefined threshold amount greater than the amount of output power detected on the load side of the connector 106.

If the amount of input power is more that the predefined threshold amount greater than the output power, thereby indicating a failure of a component such as the connector 106, then a shutdown module 114 shuts down 508 all or part of the switching power supply 102 in order to prevent smoke, fire, or some other catastrophic condition from occurring, and the method 500 ends.

If the amount of detected input power is not more than the predefined threshold amount greater than the amount of detected output power, then operation continues 510 normally, and the input power detection module continues to detect 502 the amount of input power on the power supply side of the connector 106.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for detecting a failure of a power system, the apparatus comprising:
  an input power detection module that detects an amount of input power provided on a power supply side of a connector, the connector configured to connect a switching power supply to a load such that power flows from the switching power supply to the load through the connector;
  an output power detection module that detects an amount of output power provided on a load side of the connector;
  a failure detection module that determines if the amount of input power detected on the power supply side of the connector is more than a predefined threshold amount greater than the amount of output power detected on the load side of the connector; and
  a shutdown module that shuts down the switching power supply in response to the failure detection module determining that the amount of input power detected on the power supply side of the connector is more than the predefined threshold amount greater than the amount of output power detected on the load side of the connector.

2. The apparatus of claim 1, wherein the input power detection module detects the amount of input power on the power supply side of the connector by detecting an amount of power provided at an input to the switching power supply.

3. The apparatus of claim 1, wherein the input power detection module detects the amount of input power on the power supply side of the connector by detecting an amount of power provided at an output of the switching power supply.

4. The apparatus of claim 1, wherein the input power detection module detects the amount of input power on the power supply side of the connector by detecting an amount of power provided at a node within the switching power supply.

5. The apparatus of claim 1, further comprising a lookup table with one or more predefined threshold amounts defined therein.

6. The apparatus of claim 5, wherein the one or more predefined threshold amounts in the lookup table correspond respectively to an amount of output power detected on the load side of the connector, each threshold amount indicating an acceptable amount of power difference between the input power detected on the power supply side of the connector and the output power detected on the load side of the connector for each corresponding amount of output power.

7. The apparatus of claim 6, wherein the failure detection module utilizes the lookup table to determine a predefined threshold amount corresponding to the amount of output power detected on the load side of the connector.

8. The apparatus of claim 1, further comprising:
  a second input power detection module that detects an amount of input power provided on a power supply side of a second connector, the second connector configured to connect a second switching power supply to the load such that power flows from the second switching power supply to the load through the second connector;
  a second output power detection module that detects an amount of output power provided on a load side of the second connector;
  a second failure detection module that determines if the amount of input power detected on the power supply side of the second connector is more than a predefined threshold amount greater than the amount of output power detected on the load side of the second connector; and
  a second shutdown module that shuts down the second switching power supply in response to the second failure detection module determining that the amount of input power detected on the power supply side of the second connector is more than the predefined threshold amount greater than the amount of output power detected on the load side of the second connector.

9. The apparatus of claim 8, wherein one or more of the detected output power, the detected input power, and the predefined threshold amount is adjusted to account for power changes caused by the connection of the second switching power supply to the load.

10. A system for detecting a failure of a power system, the system comprising:
  a switching power supply;
  a load;
  a connector between the switching power supply and the load, the connector configured to connect the switching power supply to the load such that power flows from the switching power supply to the load through the connector;

an input power detection module that detects an amount of input power provided on a power supply side of the connector;

an output power detection module that detects an amount of output power provided on a load side of the connector;

a failure detection module that determines if the amount of input power detected on the power supply side of the connector is more than a predefined threshold amount greater than the amount of output power detected on the load side of the connector; and a shutdown module that shuts down the switching power supply in response to the failure detection module determining that the amount of input power detected on the power supply side of the connector is more than the predefined threshold amount greater than the amount of output power detected on the load side of the connector.

11. The system of claim 10, wherein the load comprises an electronic device configured to connect to and receive power from the power supply.

12. The system of claim 11, wherein the electronic device is one of a blade server, peripheral component interconnect (PCI) card, personal computer, laptop, router, switch, personal digital assistant, appliance, and digital media player.

13. The system of claim 10, further comprising one or more additional switching power supplies connected to the load via one or more additional connectors.

14. The system of claim 13, further comprising one or more additional input power detection modules, one or more additional output power detection modules, one or more additional failure detection modules, and one or more additional shutdown modules corresponding respectively to the one or more additional switching power supplies.

15. A computer program product comprising a computer readable medium having computer usable program code executable to perform operations for detecting a failure of a power system, the computer program product comprising:

an input power detection module that detects an amount of input power provided on a power supply side of a connector, the connector configured to connect a switching power supply to a load such that power flows from the switching power supply to the load through the connector;

an output power detection module that detects an amount of output power provided on a load side of the connector;

a failure detection module that determines if the amount of input power detected on the power supply side of the connector is more than a predefined threshold amount greater than the amount of output power detected on the load side of the connector; and a shutdown module that shuts down the switching power supply in response to the failure detection module determining that the amount of input power detected on the power supply side of the connector is more than the predefined threshold amount greater than the amount of output power detected on the load side of the connector.

16. A method for detecting a failure of a power system, the method comprising:

detecting an amount of input power provided on a power supply side of a connector, the connector configured to connect a switching power supply to a load such that power flows from the switching power supply to the load through the connector;

detecting an amount of output power provided on a load side of the connector;

determining if the amount of input power detected on the power supply side of the connector is more than a predefined threshold amount greater than the amount of output power detected on the load side of the connector; and shutting down the switching power supply in response to determining that the amount of input power detected on the power supply side of the connector is more than the predefined threshold amount greater than the amount of output power detected on the load side of the connector.

17. The method of claim 16, wherein the amount of input power on the power supply side of the connector is detected by detecting an amount of power provided at an input to the power supply.

18. The apparatus of claim 16, wherein the amount of input power on the power supply side of the connector is detected by detecting an amount of power provided at an output of the power supply.

19. The apparatus of claim 16, further comprising utilizing a lookup table to retrieve a predefined threshold amount, the lookup table comprising one or more predefined threshold amounts.

20. The apparatus of claim 19, wherein the predefined threshold amounts in the lookup table indicate an acceptable amount of power difference between the input power detected on the power supply side of the connector and the output power detected on the load side of the connector, each predefined threshold amount corresponding to a particular amount of output power.

* * * * *